United States Patent
Terayama et al.

(10) Patent No.: US 11,602,477 B2
(45) Date of Patent: Mar. 14, 2023

(54) INSTRUMENT HOSE SUPPORT DEVICE AND DENTAL TREATMENT APPARATUS INCLUDING THE SAME

(71) Applicant: TAKARA BELMONT CORPORATION, Osaka (JP)

(72) Inventors: Hiroyuki Terayama, Osaka (JP); Koji Nakajima, Osaka (JP)

(73) Assignee: Takara Belmont Corporation, Osaka (JP)

( * ) Notice: Subject to any disclaimer, the term of this patent is extended or adjusted under 35 U.S.C. 154(b) by 425 days.

(21) Appl. No.: 16/759,138

(22) PCT Filed: Nov. 17, 2017

(86) PCT No.: PCT/JP2017/041437
§ 371 (c)(1),
(2) Date: Apr. 24, 2020

(87) PCT Pub. No.: WO2019/097665
PCT Pub. Date: May 23, 2019

(65) Prior Publication Data
US 2020/0323722 A1 Oct. 15, 2020

(51) Int. Cl.
*A61G 15/18* (2006.01)
*F16L 3/015* (2006.01)

(52) U.S. Cl.
CPC .............. *A61G 15/18* (2013.01); *F16L 3/015* (2013.01)

(58) Field of Classification Search
CPC ........ A61G 15/14; A61G 15/16; A61G 15/18; A61C 1/14; A61C 3/04; F16L 3/015
See application file for complete search history.

(56) References Cited

U.S. PATENT DOCUMENTS 2,873,527 A * 2/1959 Flatland ................... A61C 1/02
                                                    433/128
3,050,855 A * 8/1962 Ellis ......................... A61C 1/02
                                                    74/625

(Continued)

FOREIGN PATENT DOCUMENTS

JP     2015-167674 A    9/2015
WO    2008062101 A1    5/2008

OTHER PUBLICATIONS

International Search Report for PCT/JP2017/041437 dated Dec. 26, 2017 (PCT/ISA/210).

(Continued)

*Primary Examiner* — Benjamin F Fiorello
(74) *Attorney, Agent, or Firm* — Sughrue Mion, PLLC

(57) ABSTRACT

An instrument hose support device includes a rod that supports an instrument hose at a position higher than an instrument that is held by a holder, a pulley support portion that is supported by a distal end of the rod, a pulley that is supported by the pulley support portion and over which the instrument hose is looped. The distal end has a groove in which a taper is formed. A first member of the pulley support portion has a shaft protrusion, and a gap is formed between the shaft protrusion and the groove. The gap serves as the range of motion of the pulley support portion, and the pulley support portion follows the movement of the instrument hose and, relative to the rod, swings freely toward the front and the back and toward the sides and rotates freely with a movable axis (X) as an axis.

16 Claims, 10 Drawing Sheets

(56) References Cited

U.S. PATENT DOCUMENTS

| | | | | |
|---|---|---|---|---|
| 3,740,852 | A * | 6/1973 | Holmqvist | A61G 15/16 433/107 |
| 3,982,322 | A * | 9/1976 | Fleer | F16K 21/04 433/79 |
| 4,144,755 | A * | 3/1979 | Palloch | F16H 55/36 474/903 |
| 4,863,379 | A * | 9/1989 | Timerdahl | A61C 1/0038 433/98 |
| 4,889,488 | A * | 12/1989 | Castellini | A61G 15/16 433/110 |
| 5,017,136 | A * | 5/1991 | Gatti | A61G 15/16 433/98 |
| 2010/0129769 | A1 * | 5/2010 | Junge | A61G 15/16 433/77 |
| 2020/0330183 | A1 * | 10/2020 | Berry | A61C 1/0061 |
| 2020/0337930 | A1 * | 10/2020 | Nakajima | F16F 1/121 |

OTHER PUBLICATIONS

Communication dated Jul. 23, 2020, from the European Patent Office in European Application No. 17931862.1.

* cited by examiner

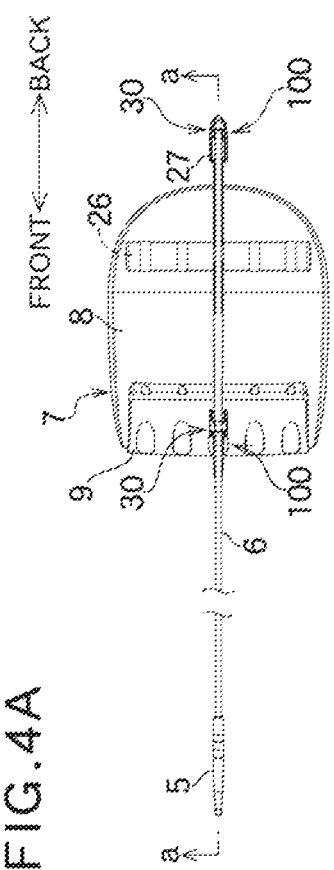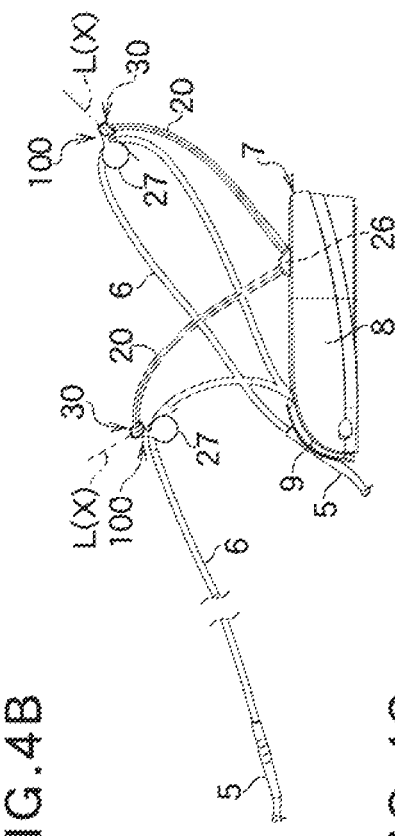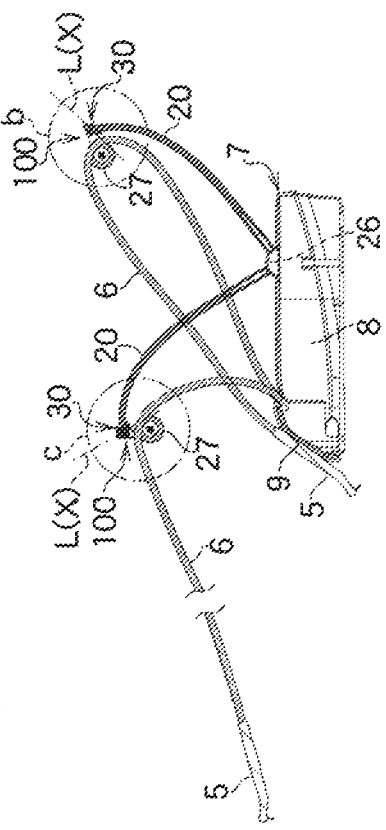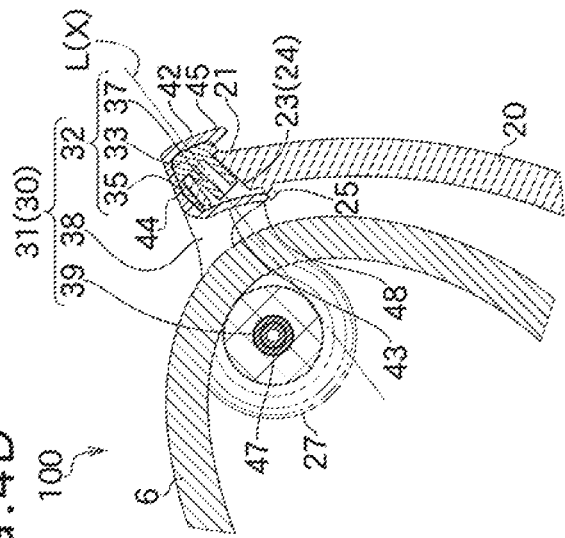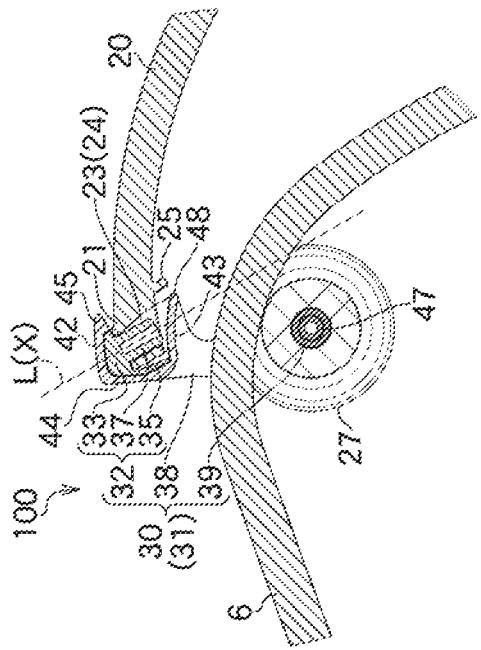

INSTRUMENT HOSE SUPPORT DEVICE AND DENTAL TREATMENT APPARATUS INCLUDING THE SAME

CROSS REFERENCE TO RELATED APPLICATIONS

This application is a National Stage of International Application No. PCT/JP2017/041437 filed Nov. 17, 2017.

TECHNICAL FIELD

The present disclosure relates to an instrument hose support device that is equipped in a dental clinic or the like and that supports a hose of an instrument and relates to a dental treatment apparatus including the instrument hose support device.

BACKGROUND ART

Existing treatment apparatuses installed in dental clinics each include a holding device that holds an instrument. For example, a holding device described in PTL 1 includes an instrument holder that holds an instrument and a swing arm that supports a hose connected to the instrument. The swing arm is elongated upward and can tilt or stand with a proximal end as an axis. A base portion is attached to a distal end of the swing arm via a fastener, and a pulley body is supported by the base portion. The base portion can rotate relative to the swing arm with the fastener as an axis. The hose is looped over the pulley body.

When a dentist, a dental hygienist, or the like (hereinafter, referred to as a "dentist or the like") holds and pulls the instrument, the hose is pulled, and the swing arm simultaneously tilts. On this occasion, the base portion follows the direction in which the hose is pulled, and rotates relative to the swing arm.

CITATION LIST

Patent Literature

[PTL 1] Japanese Unexamined Patent Application Publication No. 2015-167674

SUMMARY OF INVENTION

Technical Problem

However, as described above, with the existing technology, the range of motion of the base portion is limited because the base portion is attached via the fastener and the direction in which the base portion rotates is either a clockwise direction or a counterclockwise direction. The hose is pulled in a variety of directions. Thus, if the direction in which the hose is pulled is out of the range of motion of the base portion, the hose is not pulled smoothly, and operation of the instrument is interrupted.

The present disclosure has been proposed under the above-described circumstances. That is, an object of the present disclosure is to provide an instrument hose support device that allows an instrument hose to follow, in a smooth manner, in a variety of directions in which the instrument hose is pulled and to provide a dental treatment apparatus including the instrument hose support device.

Solution to Problem

To achieve the above-described object, an instrument hose support device according to the present disclosure includes a rod that supports an instrument hose at a position higher than an instrument, a pulley support portion that is supported by a distal end of the rod, and a pulley that is supported by the pulley support portion and over which the instrument hose is looped. The pulley support portion rotates freely and swings freely with an imaginary line as a movable axis, the imaginary line intersecting the distal end and facing the rod.

The instrument hose support device according to the present disclosure further includes a shaft protrusion that is formed on the movable axis and a groove that is formed on the movable axis and into which the shaft protrusion is inserted. A taper is formed in the shaft protrusion or in the groove.

In the instrument hose support device according to the present disclosure, when the rod capable of tilting or standing with a proximal end side as an axis is standing, the rod and the pulley support portion are in contact with each other at a position lower than the distal end.

In the instrument hose support device according to the present disclosure, a contact protrusion that comes into contact with one of the rod and the pulley support portion is formed on the other one of the rod and the pulley support portion.

In the instrument hose support device according to the present disclosure, the pulley support portion is composed of a first member and a second member. The first member is composed of a first support portion that is supported by the distal end, a first arm portion that extends from the first support portion toward the pulley, and a first support shaft that is formed on the first arm portion and inserted through a shaft of the pulley. The second member is composed of a second support portion that is fitted to the first support portion from a side opposite to the rod relative to the first member; a second arm portion that extends from the second support portion toward the pulley; and a second support shaft that is formed on the second arm portion, that is inserted in the shaft of the pulley, and that is fitted in the first support shaft.

In the instrument hose support device according to the present disclosure, one of the shaft protrusion and the groove is formed at the first support portion, and the other one of the shaft protrusion and the groove is formed at the distal end.

A dental treatment apparatus according to the present disclosure includes the instrument hose support device.

Advantageous Effects of Invention

The instrument hose support device according to the present disclosure includes the rod that supports the instrument hose at a position higher than an instrument, the pulley support portion that is supported by the distal end of the rod, and the pulley that is supported by the pulley support portion and over which the instrument hose is looped. The pulley support portion rotates freely and swings freely with an imaginary line as a movable axis, the imaginary line intersecting the distal end and facing the rod. Thus, the instrument hose support device that allows the instrument hose to be pulled in a variety of directions in a smooth manner is realized.

BRIEF DESCRIPTION OF DRAWINGS

FIGS. 4A, 4B, 4C, 4D, and 4E illustrate a state in which the instrument hose support device according to the first embodiment of the present disclosure is in use, FIG. 4A is a plan view when viewed from above, FIG. 4B is a side view when viewed from the side, FIG. 4C is a sectional side view taken along line a-a in FIG. 4A, FIG. 4D is an enlarged view of portion b in FIG. 4C, and FIG. 4E is an enlarged view of portion c in FIG. 4C.

FIG. 5A is a perspective view, and FIG. 5B is a front view when viewed from the front.

FIG. 6A is a plan view, FIG. 6B is a side view, FIG. 6C is an enlarged view of portion d in FIG. 6A, and FIG. 6D is an enlarged view of portion e in FIG. 6B.

DESCRIPTION OF EMBODIMENTS

Figure 1:
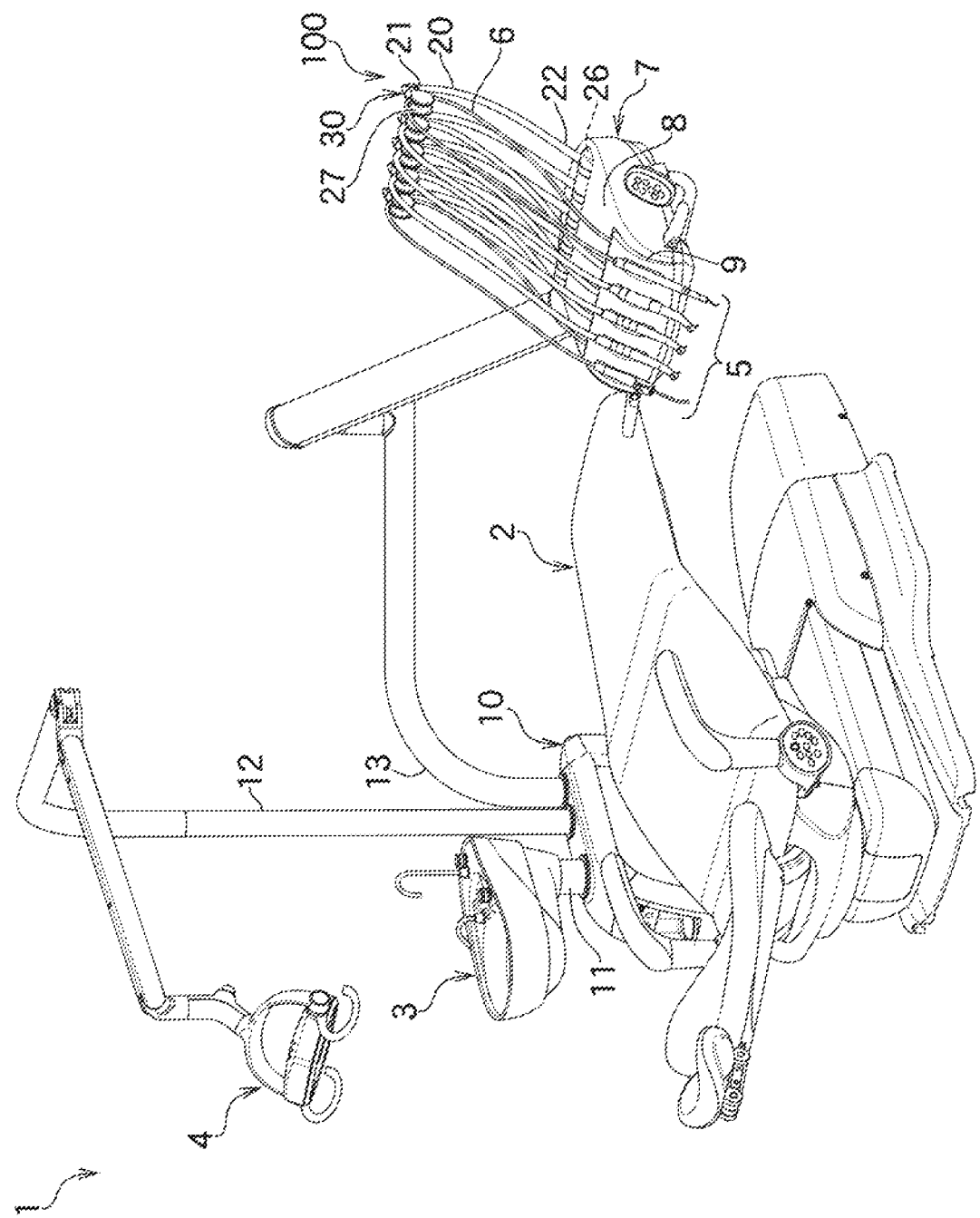
FIG. 1 is a perspective view of a dental treatment apparatus according to a first embodiment of the present disclosure.

An instrument hose support device according to the present disclosure includes a rod that supports an instrument hose at a position higher than an instrument, a pulley support portion that is supported by a distal end of the rod, and a pulley that is supported by the pulley support portion and over which the instrument hose is looped. The pulley support portion rotates freely and swings freely with an imaginary line as a movable axis, the imaginary line intersecting the distal end and facing the rod. Due to this configuration, when the instrument hose is pulled, the pulley support portion follows the direction in which the instrument hose is pulled, and the pulley support portion rotates freely and swings freely with the imaginary line as an axis. Thus, the instrument hose support device that allows the instrument hose to be pulled in a variety of directions in a smooth manner is realized. To be more specific, when a dentist or the like treats a tooth in the upper jaw or in the lower jaw of a person to be treated, the dentist or the like twists the wrist to change the orientation of the instrument. On this occasion, the instrument hose support device according to the present disclosure enables smooth operation without applying stress to the wrist of the dentist or the like.

The instrument hose support device according to the present disclosure further includes a shaft protrusion that is formed on the movable axis and a groove that is formed on the movable axis and into which the shaft protrusion is inserted. A taper is formed in the shaft protrusion or in the groove. That is, due to the taper, a gap is formed between the shaft protrusion and the groove. Thus, when the instrument hose is pulled, the pulley support portion follows the direction in which the instrument hose is pulled and swings freely. Thus, the instrument hose support device that allows the instrument hose to be pulled in a variety of directions in a smooth manner is realized.

In the instrument hose support device according to the present disclosure, when the rod capable of tilting or standing with a proximal end side as an axis is standing, the rod and the pulley support portion are in contact with each other at a position lower than the distal end. Due to this configuration, when the rod is standing, the pulley support portion is in contact with the rod and remains still, and the pulley support portion does not rotate or swing. Thus, when the rod is standing, the position of the pulley support portion is stable. In particular, even when a plurality of rods is arranged, pulley support portions of the respective rods are all directed in the same direction and do not come into contact with each other, and the respective instrument hoses also do not come into contact with each other.

In the instrument hose support device according to the present disclosure, a contact protrusion that comes into contact with one of the rod and the pulley support portion is formed on the other one of the rod and the pulley support portion. That is, when the contact protrusion is formed on the rod and if the rod is standing, the pulley support portion is in contact with the contact protrusion of the rod and remains still. In contrast, when the contact protrusion is formed on the pulley support portion and if the rod is standing, the contact protrusion is in contact with the rod, and the pulley support portion remains still. Thus, when the rod is standing, the position of the pulley support portion is stable.

In the instrument hose support device according to the present disclosure, the pulley support portion is composed of a first member and a second member. The first member is composed of a first support portion that is supported by the distal end, a first arm portion that extends from the first support portion toward the pulley, and a first support shaft that is formed on the first arm portion and inserted through a shaft of the pulley. The second member is composed of a second support portion that is fitted to the first support portion from a side opposite to the rod relative to the first member; a second arm portion that extends from the second support portion toward the pulley; and a second support shaft that is formed on the second arm portion, that is inserted in the shaft of the pulley, and that is fitted in the first support shaft. That is, it is easy to clean the instrument hose support device because the pulley support portion is disassembled into the first member and the second member. In addition, disassembly and assembly are also easy because two members constitute the pulley support portion. On this occasion, no tools are needed.

In the instrument hose support device according to the present disclosure, one of the shaft protrusion and the groove is formed at the first support portion, and the other one of the shaft protrusion and the groove is formed at the distal end. That is, the instrument hose support device is realized by having a configuration in which the shaft protrusion is formed on the first support portion and the groove is formed in the distal end or a configuration in which the groove is formed in the first support portion and the shaft protrusion is formed on the distal end. Both of the configurations are simple.

A dental treatment apparatus according to the present disclosure includes the instrument hose support device. Thus, the dental treatment apparatus can produce the advantageous effects similar to those produced by the instrument hose support device.

The following is a description of an instrument hose support device and a dental treatment apparatus according to a first embodiment of the present disclosure. FIG. 1 illustrates a dental treatment apparatus 1 including an instrument hose support device 100.

As illustrated in FIG. 1, the dental treatment apparatus 1 incudes a treatment seat 2 on which a person to be treated who is a patient lies, a spittoon 3 into which the person to be treated spits out water kept in the mouth, a dental light 4 for illuminating the mouth of the person to be treated, and an instrument holding device 7 that holds various instruments 5. The spittoon 3, the dental light 4, and the instrument holding device 7 are supported by a base stand 10. The base stand 10 is installed beside the treatment seat 2.

The spittoon 3 is installed above the base stand 10 via a pipe 11. The spittoon 3 is a bowl. The dental light 4 is connected to a distal end of a first movable arm 12 attached to the base stand 10. The instrument holding device 7 is connected to a distal end of a second movable arm 13 attached to the base stand 10. The first movable arm 12 and the second movable arm 13 each have a plurality of joints. Thus, the dental light 4 can be moved freely via the first movable arm 12. The instrument holding device 7 can also be moved freely via the second movable arm 13.

The instruments 5 held by the instrument holding device 7 are, for example, a turbine, a micro motor, an air motor, a scaler, and a syringe. Each instrument 5 is connected to an instrument hose 6.

The instrument holding device 7 includes a main body 8, a holder 9 that holds the instrument 5 therein, and the instrument hose support device 100. The holder 9 is attached on a front face of the main body 8. On the other hand, the instrument hose support device 100 is attached to a top face at the back of the main body 8.

The instrument hose support device 100 includes a rod 20 that supports the instrument hose 6 at a position higher than the instrument 5 that is held by the holder 9, a pulley support portion 30 that is supported by a distal end 21 of the rod 20, a pulley 27 that is supported by the pulley support portion 30 and over which the instrument hose 6 is looped, and a movable member 26 that allows the rod 20 to tilt and to stand with a proximal end 22 side of the rod 20 as an axis. With reference to the main body 8, the direction in which the rod 20 tilts will be referred to as the "front", and the direction in which the rod 20 stands and returns to the original position will be referred to as the "back" (refer to FIGS. 2 and 4A).

Figure 2:
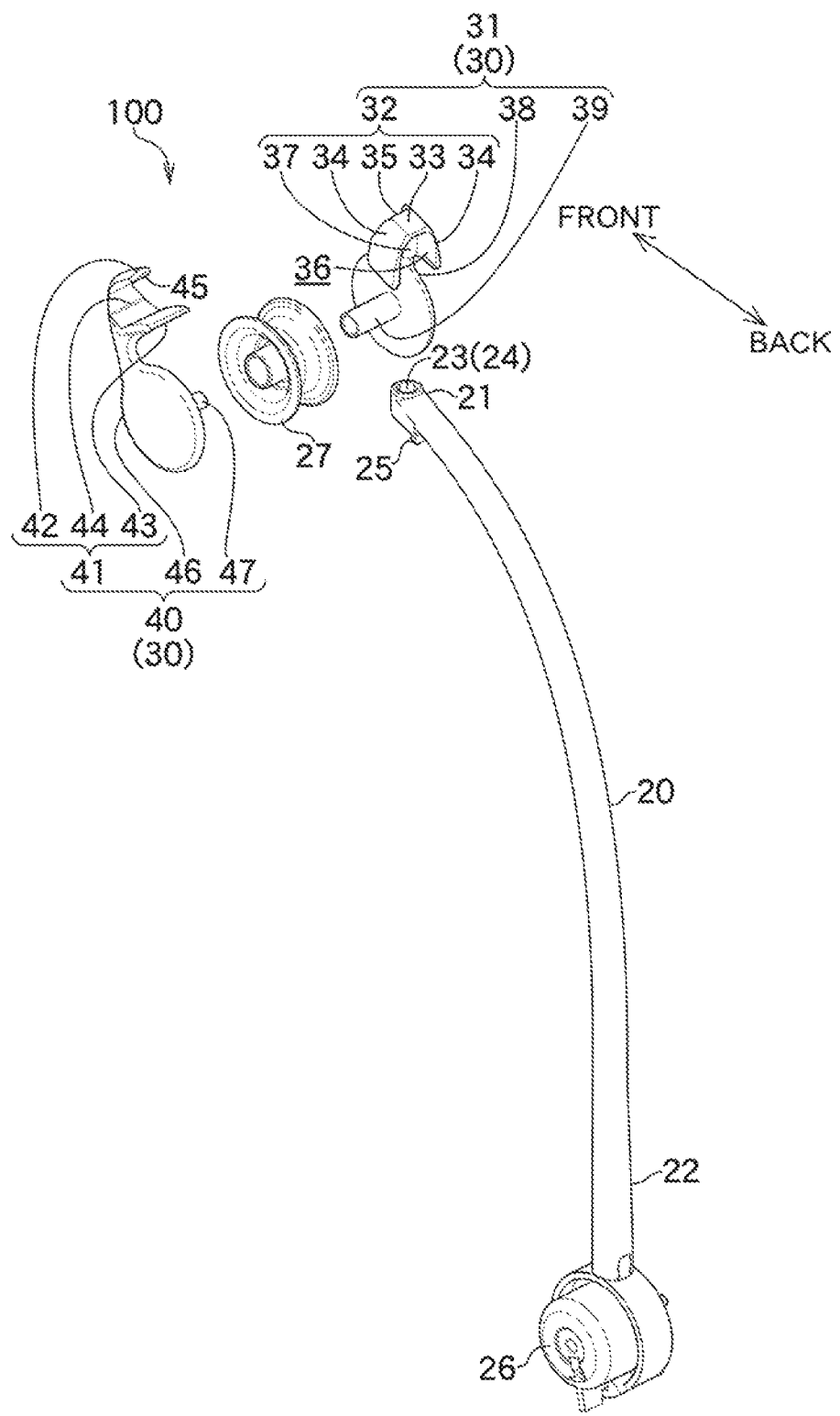
FIG. 2 is an exploded perspective view of a disassembled instrument hose support device according to the first embodiment of the present disclosure.
Figure 3:
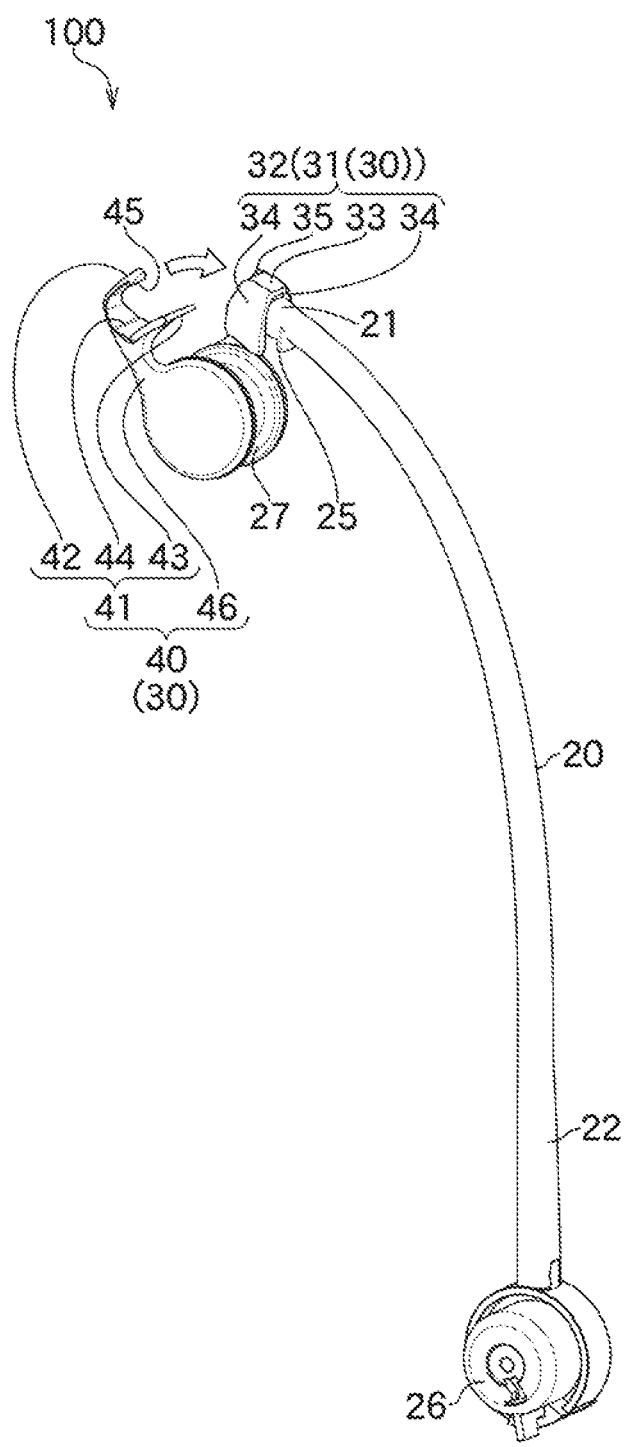
FIG. 3 is a partially assembled perspective view illustrating a state in which the instrument hose support device according to the first embodiment of the present disclosure is partially assembled.

Here, the instrument hose support device 100 will be described with reference to the drawings. FIG. 2 illustrates the disassembled instrument hose support device 100. FIG. 3 illustrates a state in which the instrument hose support device 100 is partially assembled.

As illustrated in FIGS. 2 and 3, the rod 20 has a thin elongated rod shape. A portion on the proximal end 22 side of the rod 20 has a linear shape and is connected to the movable member 26. A portion on the distal end 21 side of the rod 20 curves toward the front. The distal end 21 has a groove 23 that extends therethrough in the up-down direction (refer to FIGS. 4D and 4E). The groove 23 has a cylindrical shape, and a taper 24 is formed therein. That is, the diameter of the groove 23 gradually decreases from the bottom to the top. A contact protrusion 25 is formed at a position near the distal end 21 and lower than the distal end 21. The contact protrusion 25 protrudes from an outer surface of the rod 20 toward the front.

The pulley support portion 30 is composed of a first member 31 and a second member 40. The first member 31 is composed of a first support portion 32 that is supported by the distal end 21 of the rod 20, a first arm portion 38 that extends from the first support portion 32 toward the pulley 27, and a first support shaft 39 that is formed on the first arm portion 38 and inserted through a shaft of the pulley 27. The second member 40 is composed of a second support portion 41 that is fitted to the first support portion 32 from the front side that is a side opposite to the rod 20 relative to the first member 31; a second arm portion 46 that extends from the second support portion 41 toward the pulley 27; and a second support shaft 47 that is formed on the second arm portion 46, that is inserted in the shaft of the pulley 27, and that is fitted in the first support shaft 39.

The first arm portion 38 of the first member 31 has a disk shape and has a diameter substantially the same as the diameter of the pulley 27. The first support shaft 39 is formed at the center of the circle. The first support shaft 39 has a columnar rod shape and protrudes from the first arm portion 38 toward the side. A part of an upper end of the first arm portion 38 protrudes, and the first support portion 32 is formed in the protruding part. The first support portion 32 protrudes from the upper end of the first arm portion 38 toward the side and faces the first support shaft 39. The first support portion 32 is composed of a flat-plate-shaped first top face 33, a pair of first side faces 34 that is connected to the respective side ends of the first top face 33, and a first front face 35 that is connected to a front end of the first top face 33 and that is connected to the front ends of the first side faces 34. One of the pair of the first side faces 34 is connected to the first arm portion 38 and flush with the first arm portion 38. A support space 36 is formed by being surrounded by the first top face 33, the first side faces 34, and the first front face 35. The bottom side and the back side of the support space 36 open. In the support space 36, a shaft protrusion 37 is formed at the center of the first top face 33. The shaft protrusion 37 has a columnar rod shape and protrudes downward from the first top face 33.

As with the first arm portion 38, the second arm portion 46 of the second member 40 has a disk shape and has a diameter substantially the same as the diameter of the pulley 27. The second support shaft 47 is formed at the center of the circle. The second support shaft 47 has a columnar rod shape and protrudes from the second arm portion 46 toward the side. The diameter of the second support shaft 47 is smaller than that of the first support shaft 39 of the first member 31. A part of an upper end of the second arm portion 46 protrudes, and the second support portion 41 is formed in the protruding part. The second support portion 41 protrudes from the upper end of the second arm portion 46 toward the side and faces the second support shaft 47. The second support portion 41 is composed of a flat-plate-shaped second top face 42 that is connected from the side, a flat-plate-shaped second bottom face 43 that is connected from the side as with the second top face 42 and that faces the second top face 42, and a second front face 44 that is connected to the front end of each of the second top face 42 and the second bottom face 43. An engagement portion 45 is formed in a back end of the second top face 42.

The shaft protrusion 37 of the first member 31 is inserted into the groove 23 of the rod 20 from above. Here, the taper 24 is formed in the groove 23; thus, a gap is formed between the shaft protrusion 37 and the groove 23 in a state in which the shaft protrusion 37 is inserted into the groove 23 (refer to FIGS. 4D and 4E). The first support shaft 39 of the first member 31 is inserted through an opening formed at the center of the pulley 27.

The second support shaft 47 of the second member 40 is inserted in the opening of the pulley 27 and also in the first support shaft 39 of the first member 31. The second support shaft 47 is fitted in the first support shaft 39. The second support portion 41 of the second member 40 is disposed in front of the first support portion 32 of the first member 31. When the second member 40 rotates with the second support shaft 47 as an axis (refer to the arrow in FIG. 3), the second support portion 41 comes to be fitted to the first support portion 32 from the front. That is, the second top face 42 covers the first top face 33, and the engagement portion 45 becomes engaged with the back end of the first top face 33. At the same time, the second front face 44 covers the first front face 35, and the second bottom face 43 is disposed on the bottom side of the support space 36 of the first member 31. A contact end portion 48 is formed in the back end of the second bottom face 43 (refer to FIGS. 4D and 4E). The contact end portion 48 may be formed in the back end of a lower portion of each of the first side faces 34.

Figure 5A:
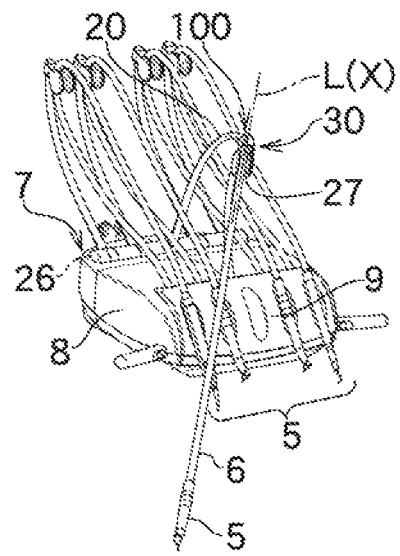
FIGS. 5A and 5B illustrate the state in which the instrument hose support device according to the first embodiment of the present disclosure is in use.
Figure 5B:
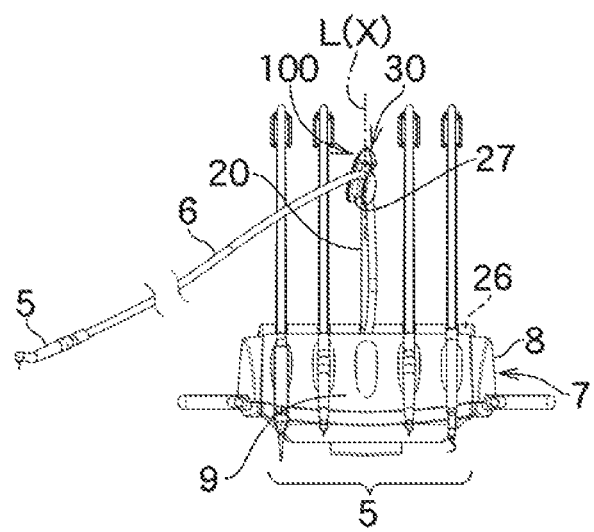
Figure 6A:
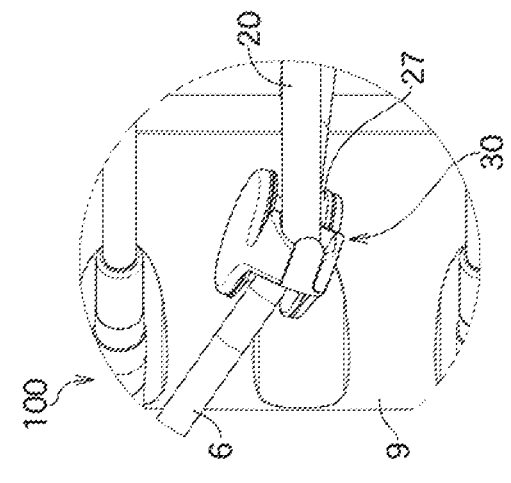
FIGS. 6A, 6B, 6C, and 6D illustrate the state in which the instrument hose support device according to the first embodiment of the present disclosure is in use.
Figure 6C:
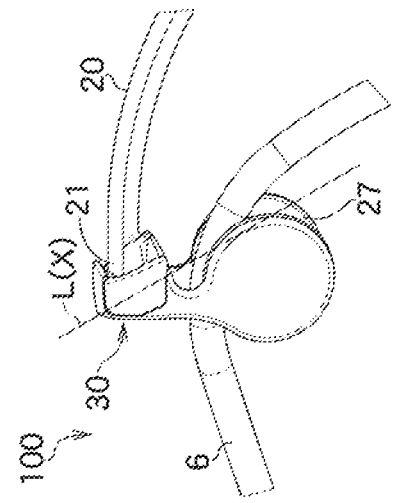
Figure 6B:
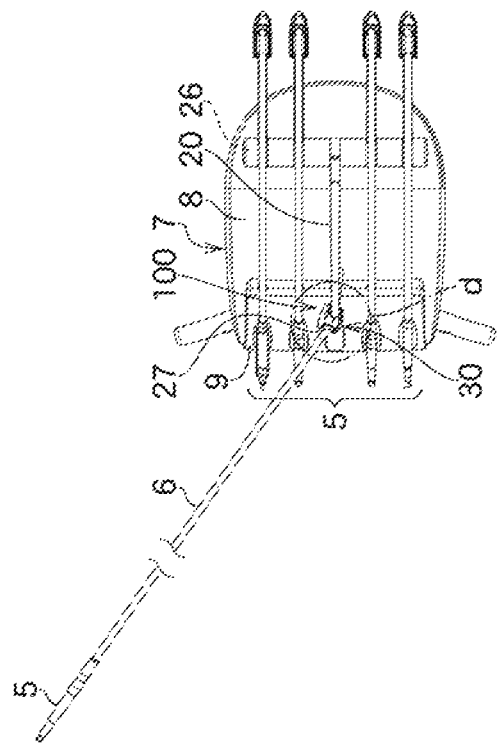
Figure 6D:
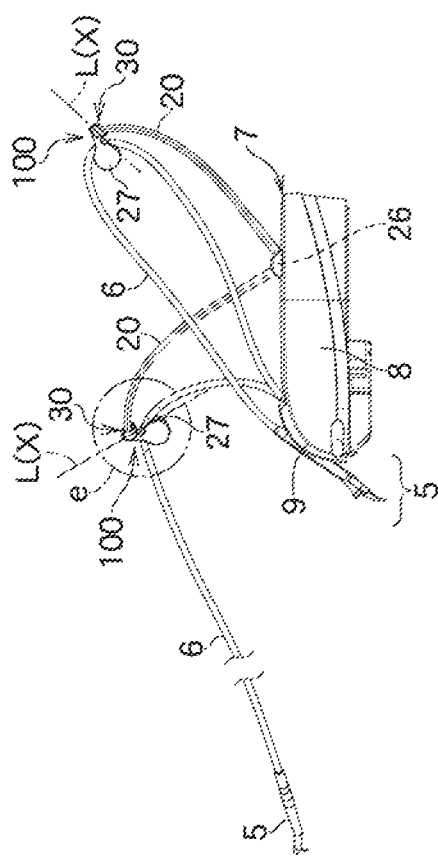

The instrument hose support device 100 is formed as described above. The following is a description of the functions of the instrument hose support device 100. FIGS. 4A, 4B, 4C, 4D, and 4E illustrate the instrument hose support device 100 in a state before the instrument hose 6 is pulled and in a state after the instrument hose 6 is pulled. FIGS. 5A and 5B illustrate the instrument hose support device 100 in a state in which the instrument hose 6 is pulled in a direction diagonal to the direction in which the rod 20 tilts. FIGS. 6A, 6B, 6C, and 6D illustrate the instrument hose support device 100 in the state before the instrument hose 6 is pulled and in the state after the instrument hose 6 is pulled in the diagonal direction as in FIGS. 5A and 5B.

As illustrated in FIGS. 4A, 4B, 4C, 4D, and 4E, the pulley support portion 30 swings freely relative to the rod 20 with an imaginary line L as a movable axis X, the imaginary line L intersecting the distal end 21 of the rod 20 and facing the rod 20. The movable axis X lies along the imaginary line L, and the groove 23 of the rod 20 and the shaft protrusion 37 of the first member 31 are disposed on the movable axis X. In other words, the imaginary line L is the central axis of the groove 23.

When the instrument 5 is pulled toward the front together with the instrument hose 6, the rod 20 follows the movement of the instrument hose 6 and tilts toward the front. The gap between the shaft protrusion 37 and the groove 23 serves as the range of motion of the pulley support portion 30, and the pulley support portion 30 thus swings toward the front and the back with the movable axis X as an axis.

When the instrument 5 becomes free from external force and the rod 20 stands toward the back, the instrument hose 6 follows the movement of the rod 20 and is pulled toward the back. When the rod 20 returns to the original position, the contact end portion 48 of the pulley support portion 30 comes into contact with the contact protrusion 25 of the rod 20. That is, the pulley support portion 30 is placed on the contact protrusion 25.

As illustrated in FIGS. 5A and 5B and 6A, 6B, 6C, and 6D, the pulley support portion 30 freely rotates relative to the rod 20 with the movable axis X as an axis. When the instrument 5 is pulled toward the front and toward the side together with the instrument hose 6, the rod 20 tilts toward the front, and the pulley support portion 30 simultaneously rotates with the movable axis X as an axis. The shaft protrusion 37 of the pulley support portion 30 has a columnar shape, and the groove 23 of the rod 20, on the other hand, has a cylindrical shape (refer to FIGS. 4D and 4E). Thus, the pulley support portion 30 freely rotates relative to the rod 20. In addition, the pulley support portion 30 swings toward the front and the back and toward the sides with the movable axis X as an axis.

That is, as illustrated in FIGS. 4A, 4B, 4C, 5A, 5B, 6A, and 6B, the pulley support portion 30 follows the movement of the instrument hose 6 and, relative to the rod 20, swings freely toward the front and the back and toward the sides and rotates freely with the movable axis X as an axis.

The instrument hose support device 100 operates as described above. The following is a description of instrument hose support devices 200, 300, 400, and 500 according to other embodiments of the present disclosure. FIGS. 7A and 7B, FIGS. 8A and 8B, FIGS. 9A and 9B, and FIGS. 10A and 10B respectively illustrate an enlarged portion of one of the instrument hose support devices 200, 300, 400, and 500 each in a state before the corresponding instrument hose 6 is pulled and in a state after the corresponding instrument hose 6 is pulled. Hereinafter, mainly, configurations different from those of the instrument hose support device 100 according to the first embodiment will be described, and a description of configurations similar to those of the instrument hose support device 100 will be omitted.

Figure 7A:
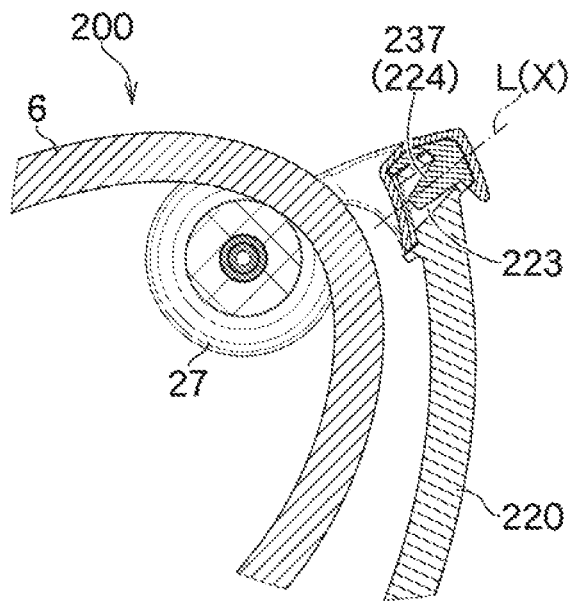
FIGS. 7A and 7B are enlarged sectional side views of a main portion of an instrument hose support device according to a second embodiment of the present disclosure.
Figure 7B:
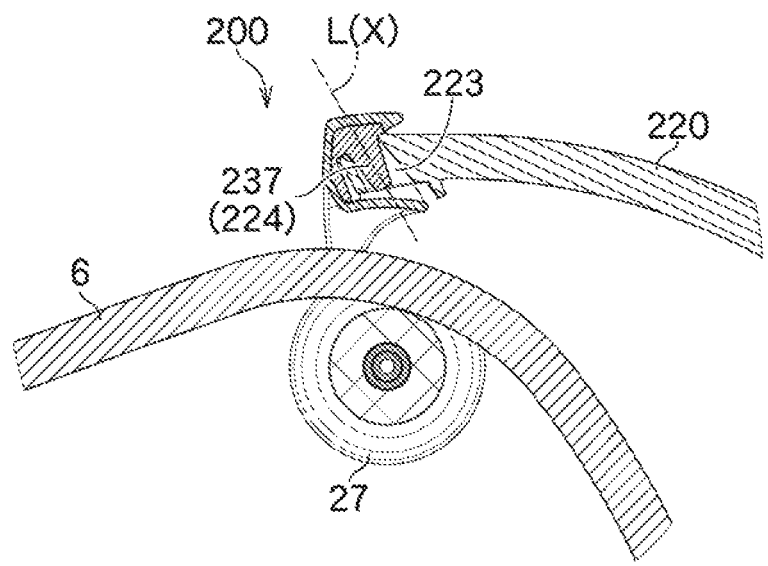

FIGS. 7A and 7B illustrate a portion of the instrument hose support device 200 according to a second embodiment. As illustrated in FIGS. 7A and 7B, a taper 224 is formed in a shaft protrusion 237, and the diameter of the shaft protrusion 237 gradually decreases from the top to the bottom. A groove 223 of a rod 220 has a cylindrical shape, and a taper is not formed therein.

Figure 8A:
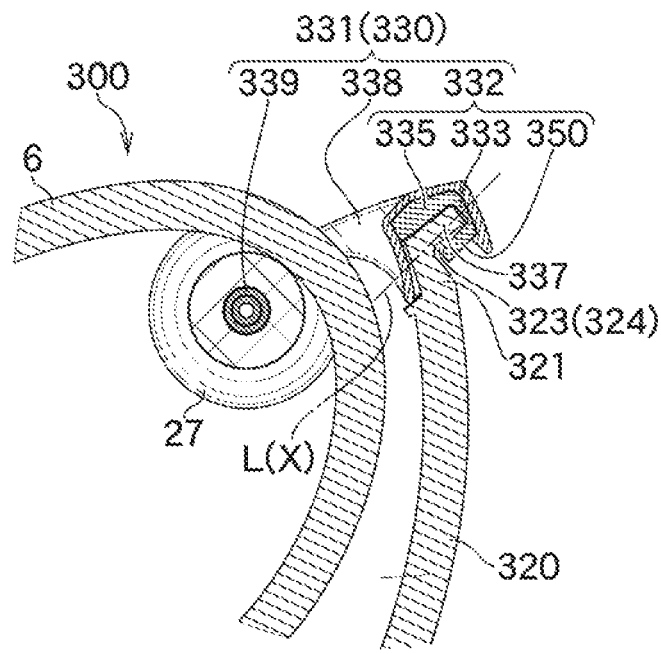
FIGS. 8A and 8B are enlarged sectional side views of a main portion of an instrument hose support device according to a third embodiment of the present disclosure.
Figure 8B:
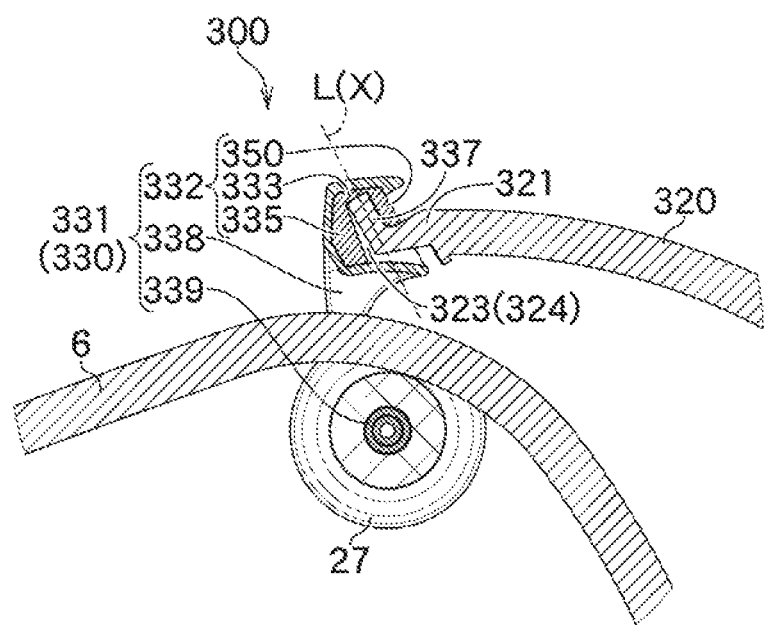

FIGS. 8A and 8B illustrate a portion of the instrument hose support device 300 according to a third embodiment. As illustrated in FIGS. 8A and 8B, on the movable axis X, a shaft protrusion 337 protruding upward is formed on a distal end 321 of a rod 320. A first support portion 332 of a first member 331 has a first back face 350 connected to a back end of a first top face 333 and to back ends of first side faces 334. A groove 323 is formed by being surrounded by the first top face 333, the first side faces 334, a first front face 335, and the first back face 350. The groove 323 has a cylindrical shape, and a taper 324 is formed therein.

Figure 9A:
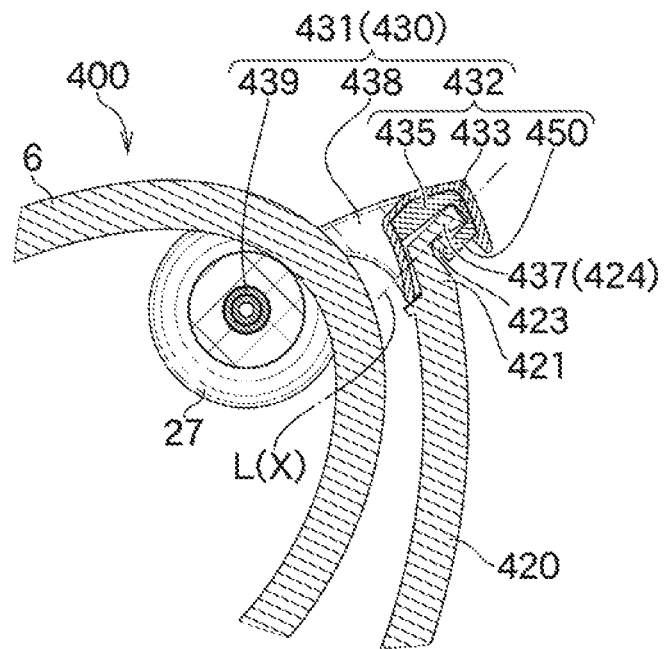
FIGS. 9A and 9B are enlarged sectional side views of a main portion of an instrument hose support device according to a fourth embodiment of the present disclosure.
Figure 9B:
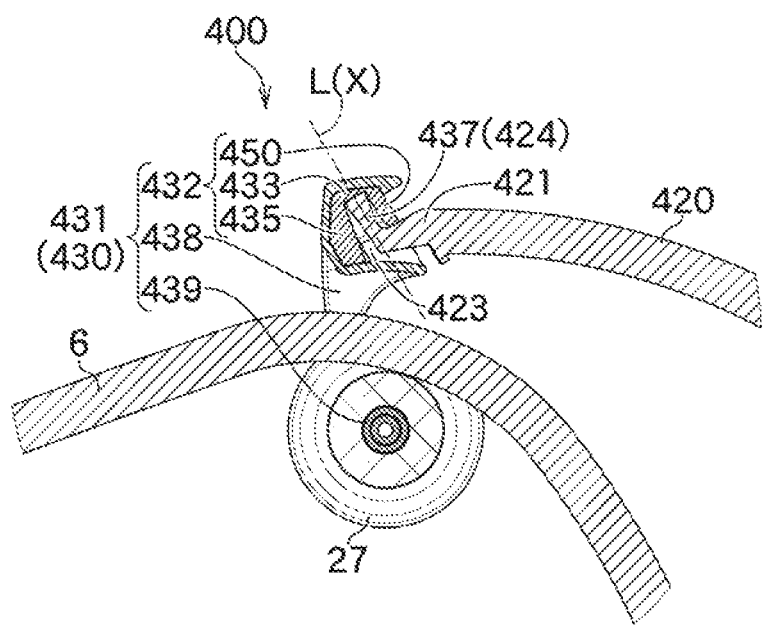

FIGS. 9A and 9B illustrate the instrument hose support device 400 according to a fourth embodiment. As illustrated in FIGS. 9A and 9B, on the movable axis X, a shaft protrusion 437 protruding upward is formed on a distal end 421 of a rod 420. A taper 424 is formed in the shaft protrusion 437, and the diameter of the shaft protrusion 437 gradually decreases from the top to the bottom. A first support portion 432 of a first member 431 has a first back face 450 connected to a back end of a first top face 433 and to back ends of first side faces 434. A groove 423 is formed by being surrounded by the first top face 433, the first side faces 434, a first front face 435, and the first back face 450. The groove 423 has a cylindrical shape, and a taper is not formed therein.

Figure 10A:
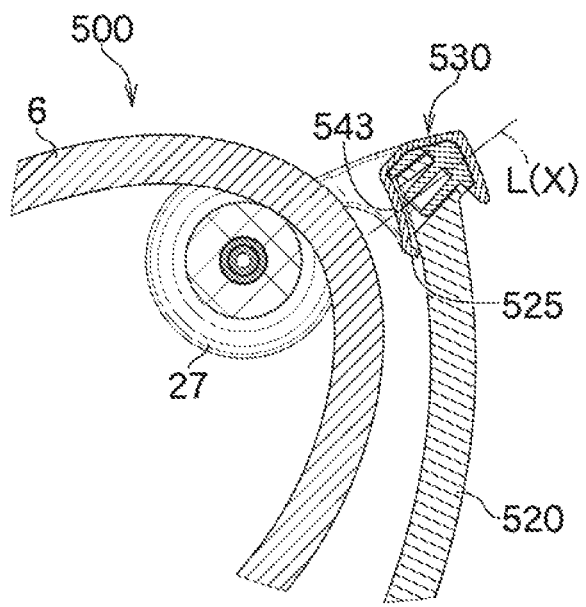
FIGS. 10A and 10B are enlarged sectional side views of a main portion of an instrument hose support device according to a fifth embodiment of the present disclosure.
Figure 10B:
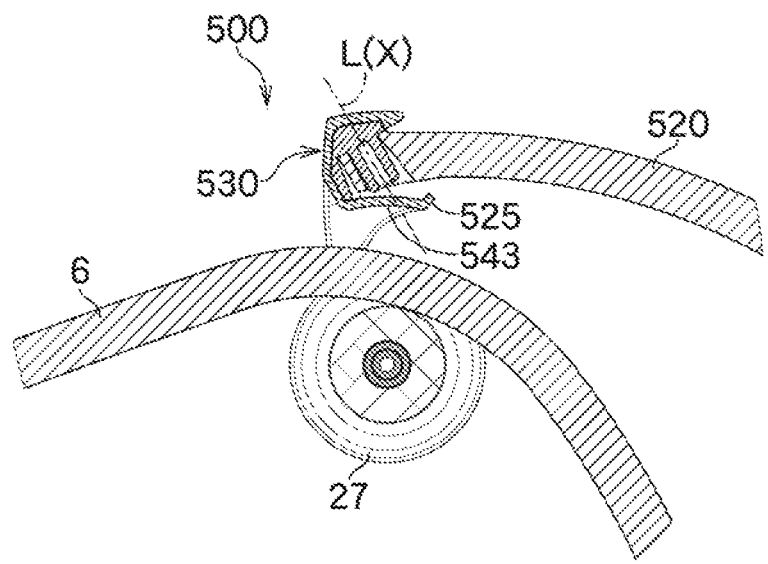

FIGS. 10A and 10B illustrate the instrument hose support device 500 according to a fifth embodiment. As illustrated in FIGS. 10A and 10B, a contact protrusion 525 is formed at a back end of a second bottom face 543 of a pulley support portion 530. The contact protrusion 525 protrudes toward a rod 520. When the rod 520 returns to the original position, the contact protrusion 525 of the pulley support portion 530 comes into contact with the rod 520. There are embodiments in which the instrument hose support devices 200, 300, and 400 according to the second to fourth embodiments have the configuration of the fifth embodiment.

The instrument hose support devices 100, 200, 300, 400, and 500 are formed as described above. The following is a description of the advantageous effects of the instrument hose support device 100. The advantageous effects of the instrument hose support devices 200, 300, 400, and 500 are similar to those of the instrument hose support device 100, and thus description of the advantageous effects thereof will be omitted.

In the instrument hose support device 100, the groove 23 is formed in the distal end 21 of the rod 20. The groove 23 has a cylindrical shape, and the taper 24 is formed therein (refer to FIGS. 4D and 4E). On the other hand, the shaft protrusion 37 is formed in the first member 31 of the pulley support portion 30. The shaft protrusion 37 is inserted into the groove 23 from above. The taper 24 is formed in the groove 23; thus, a gap is formed between the shaft protrusion 37 and the groove 23 in a state in which the shaft protrusion 37 is inserted into the groove 23 (refer to FIGS. 4D and 4E). The gap serves as the range of motion of the pulley support portion 30. Due to the configuration, when the instrument hose 6 is pulled, the pulley support portion 30 follows the movement of the instrument hose 6 and, relative to the rod 20, swings freely toward the front and the back and toward the sides and rotates freely with the movable axis X as an axis. Thus, the instrument hose support device 100 that allows the instrument hose 6 to be pulled in a variety of directions in a smooth manner is realized.

In the instrument hose support device 100, the contact protrusion 25 is formed near the distal end 21 of the rod 20. The contact protrusion 25 protrudes from the outer surface of the rod 20 toward the front. The contact end portion 48 is formed in the pulley support portion 30. Due to this configuration, when the rod 20 is standing, the pulley support portion 30 is in contact with the contact protrusion 25 of the rod 20 and remains still, and the pulley support portion 30 does not rotate or swing (refer to FIG. 4D). Thus, when the rod 20 is standing, the position of the pulley support portion 30 is stable. In particular, even when a plurality of rods 20 is arranged, pulley support portions 30 of the respective rods 20 do not come into contact with each other, and the respective instrument hoses 6 also do not come into contact with each other.

When the instrument hose support device 100 is assembled, the pulley support portion 30 is prevented from falling, because the distal end 21 of the rod 20 is covered by the second bottom face 43 of the second member 40 from below. Moreover, it is easy to clean the instrument hose support device 100 because the pulley support portion 30 is disassembled into the first member 31 and the second member 40. Furthermore, disassembly and assembly are also easy because two members, which are the first member 31 and the second member 40, constitute the pulley support portion 30. On this occasion, no tools are needed.

In the instrument hose support device 100, the shaft protrusion 37 is formed on the first support portion 32 of the first member 31, and the groove 23 is formed in the distal end 21 of the rod 20. Thus, the configuration thereof is simple.

The embodiments of the present disclosure are described in detail hereinbefore; however, the present disclosure is not limited to the above-described embodiments. The present disclosure may be modified in various ways without departing from the matters described in the claims.

REFERENCE SIGNS LIST 1 dental treatment apparatus
2 treatment seat
3 spittoon
4 dental light
5 instrument
6 instrument hose
7 instrument holding device
8 main body
9 holder
10 base stand
11 pipe
12 first movable arm
13 second movable arm
100, 200, 300, 400, 500 instrument hose support device
20, 220, 320, 420, 520 rod
21, 321, 421 distal end
22 proximal end
23, 223, 323, 423 groove
24, 224, 324, 424 taper
25, 525 contact protrusion
26 movable member
27 pulley
30, 330, 430, 530 pulley support portion
31, 331, 431 first member
32, 332, 432 first support portion
33, 333, 433 first top face
34, 334, 434, 534 first side face
35, 335, 435 first front face
36, 336 support space
37, 237, 337, 437 shaft protrusion
38, 338, 438 first arm portion
39, 339, 439 first support shaft
40 second member
41 second support portion
42 second top face
43, 543 second bottom face
44 second front face
45 engagement portion
46 second arm portion
47 second support shaft
48 contact end portion
350, 450 first back face
L imaginary line
X movable axis

The invention claimed is:

1. An instrument hose support device comprising:
a rod that supports an instrument hose at a position higher than an instrument;
a pulley support portion that is supported by a distal end of the rod;
a pulley that is supported by the pulley support portion and over which the instrument hose is looped;
a shaft protrusion that is formed on a movable axis, the movable axis being a line that intersects the distal end and that is in a plane that faces the rod; and
a groove that is formed on the movable axis and into which the shaft protrusion is inserted,
wherein a taper is formed in the shaft protrusion or in the groove,
wherein a gap is formed between the shaft protrusion and the groove, and
wherein the pulley support portion rotates freely and swings freely with respect to the rod.

2. The instrument hose support device according to claim 1,
wherein a contact protrusion that comes into contact with one of the rod and the pulley support portion is formed on the other one of the rod and the pulley support portion.

3. A dental treatment apparatus comprising:
the instrument hose support device according to claim 2.

4. A dental treatment apparatus comprising:
the instrument hose support device according to claim 1.

5. An instrument hose support device comprising:
a rod that supports an instrument hose at a position higher than an instrument;
a pulley support portion that is supported by a distal end of the rod; and
a pulley that is supported by the pulley support portion and over which the instrument hose is looped,
wherein the pulley support portion rotates freely and swings freely with a line as a movable axis with respect to the rod, the line intersecting the distal end and in a plane facing the rod, and
wherein, when the rod capable of tilting or standing with a proximal end side as an axis is standing,
the rod and the pulley support portion are in contact with each other at a position lower than the distal end.

6. The instrument hose support device according to claim 5,
wherein a contact protrusion that comes into contact with one of the rod and the pulley support portion is formed on the other one of the rod and the pulley support portion.

7. A dental treatment apparatus comprising:
the instrument hose support device according to claim 6.

8. A dental treatment apparatus comprising:
the instrument hose support device according to claim 5.

9. An instrument hose support device comprising:
a rod that supports an instrument hose at a position higher than an instrument;
a pulley support portion that is supported by a distal end of the rod; and
a pulley that is supported by the pulley support portion and over which the instrument hose is looped,
wherein the pulley support portion rotates freely and swings freely with a line as a movable axis, the line intersecting the distal end and in a plane facing the rod,
wherein the pulley support portion is composed of a first member and a second member,
wherein the first member is composed of
a first support portion that is supported by the distal end,
a first arm portion that extends from the first support portion toward the pulley, and
a first support shaft that is formed on the first arm portion and inserted through a shaft of the pulley, and
wherein the second member is composed of
a second support portion that is fitted to the first support portion from a side opposite to the rod relative to the first member,
a second arm portion that extends from the second support portion toward the pulley, and
a second support shaft that is formed on the second arm portion, that is inserted in the shaft of the pulley, and that is fitted in the first support shaft.

10. The instrument hose support device according to claim 9,
wherein one of a shaft protrusion that is formed on the movable axis and a groove that is formed on the movable axis and into which the shaft protrusion is inserted is formed at the first support portion,
wherein the other one of the shaft protrusion and the groove is formed at the distal end, and
wherein a taper is formed in the shaft protrusion or the groove.

11. The instrument hose support device according to claim 10,
wherein a contact protrusion that comes into contact with one of the rod and the pulley support portion is formed on the other one of the rod and the pulley support portion.

12. A dental treatment apparatus comprising:
the instrument hose support device according to claim 11.

13. A dental treatment apparatus comprising:
the instrument hose support device according to claim 10.

14. The instrument hose support device according to claim 9,
wherein a contact protrusion that comes into contact with one of the rod and the pulley support portion is formed on the other one of the rod and the pulley support portion.

15. A dental treatment apparatus comprising:
the instrument hose support device according to claim 14.

16. A dental treatment apparatus comprising:
the instrument hose support device according to claim 9.

* * * * *